United States Patent

Vigneri

[11] Patent Number: 5,286,141
[45] Date of Patent: Feb. 15, 1994

[54] METHOD AND SYSTEM FOR REMEDIATION OF GROUNDWATER CONTAMINATION

[76] Inventor: Ronald J. Vigneri, 9 Leone Terr., Kinnelon, N.J. 07405

[21] Appl. No.: 17,478

[22] Filed: Feb. 12, 1993

[51] Int. Cl.$^5$ .............................. E02D 3/00; B09B 3/00
[52] U.S. Cl. ...................................... 405/128; 405/52; 405/263
[58] Field of Search ................. 405/52, 128, 129, 258, 405/263; 166/268, 300, 310; 210/747

[56] References Cited

U.S. PATENT DOCUMENTS

| | | |
|---|---|---|
| 4,167,973 | 9/1979 | Forte et al. . |
| 4,477,357 | 10/1984 | Sittenfield . |
| 4,591,443 | 5/1986 | Brown et al. . |
| 4,844,839 | 7/1989 | Manchak, Jr. . |
| 4,882,021 | 11/1989 | Barnhart . |
| 4,927,293 | 5/1990 | Campbell . |
| 4,936,706 | 6/1990 | Lüftenegger et al. . |
| 4,978,508 | 12/1990 | Hansen et al. . |
| 5,039,415 | 8/1991 | Smith . |
| 5,114,497 | 5/1992 | Johnson et al. ................. 405/128 X |

Primary Examiner—David H. Corbin
Attorney, Agent, or Firm—Klauber & Jackson

[57] ABSTRACT

A method for remediating a hydrocarbon-contaminated region of a subterranean body of groundwater to destroy or reduce the initial concentration levels of hydrocarbon contaminants. A plurality of mutually spaced wells are provided intersecting the groundwater region, and the existence of acceptable continuity and well interflow paths for the said region is determined by generating a test flow of a solution of hydrogen peroxide from one of the wells and monitoring pH changes at each other of the wells as a function of time to detect a pH drop of at least 0.2. Subsequent to detecting the pH drop, a treating flow of the hydrogen peroxide solution is provided from one or more of the wells. A system to enable the foregoing is also disclosed.

22 Claims, 2 Drawing Sheets

SOUTH ELEVATION

METHOD AND SYSTEM FOR REMEDIATION OF GROUNDWATER CONTAMINATION

BACKGROUND OF INVENTION

This invention relates generally to the beneficial treatment of organics-contaminated water, and more specifically relates to method and apparatus for remediating groundwater which has become contaminated with hydrocarbons.

Groundwater contamination, typically arising from petroleum storage tank spills or from intentional or accidental discharge of liquid hydrocarbons or compositions containing same, has become a problem of increasing concern in virtually all areas of the world where human activities occur. Aside from contamination of this type which results from industrial complexes, it has unfortunately been found that even suburban neighborhoods which would appear to be havens from such phenomena, have increasingly been found to the consternation of the residents to harbor pools of hydrocarbon pollutants, the source of which is very commonly automobile service station sites at which antiquated or abandoned storage tanks have released gasoline, fuel oils, lubricants and the like into the local groundwater. Other common sources of such noxious material can include dry cleaning establishments and/or manufacturers or distributors of the tetrachloroethane which is used in dry cleaning. Other well-known hazardous hydrocarbon materials include polychlorinated phenols (e.g. PCB's), pentachlorophenols (PCP's), and various aliphatic and aromatic hydrocarbons, as for example gasoline, benzene, naphthalene and various petroleum and petroleum derivative products. Certain particularly pernicious compounds of this type are often considered under the grouping "BTEX", which is understood by those familiar with the art to refer to benzene, toluene, ethyl benzene and the xylenes (m-, p-, and o-). The BTEX content of groundwater or other contaminated sites is frequently regarded as a principle measure of the acceptability of the water in question for human consumption and use and other purposes.

Various remediation techniques have been utilized in the past for treatment of groundwater which has been thus contaminated. Among the most predominate type of systems in present use are those based on so-called "pump and treat" technology. In this method the contaminated groundwater and possibly a phase-separated product is withdrawn from a recovery well sunk into the groundwater and pumped to an above ground treatment facility. Various treatment techniques are thereupon used, such as diffused air treatment and air stripping. Inline filters can also be used; and similarly carbon adsorption can serve to remove contaminants from the displaced groundwater. Systems of the pump and treat type are considered expensive to install and operate. In many instances they basically result in separation or adsorption of the contaminants, and while purified water may result from the treatment, the problem often remains of disposing of the contaminants which have thus been separated.

In recent years increasing interest has also been evidenced in bioremediation technology. The technology has been of great interest, but its effective use in treating groundwater has been limited. The procedures are very complex, involving the use of expensive and complex reactors, and can cause adverse geochemical reactions, and can even introduce new toxic compounds beyond those which are being treated.

Pursuant to the foregoing, techniques have been sought which would serve to directly treat the contaminated groundwater in both effective and economical fashion.

It has long been recognized that the hydrocarbons representing the source of contamination in the subject matter of interest, can by ordinary chemical reactions be oxidized to harmless constituents. In principle, all such hydrocarbons can under proper conditions be oxidized to harmless end products, such as water and carbon dioxide. To date, practical methodology to achieve such results, however, have not been widely adopted. Among the strong oxidizing agents which in principle could serve these purposes is hydrogen peroxide, a composition which is readily available and at reasonable cost. Some efforts have indeed been made to utilize this oxidizing agent for these purposes. In Brown et al., U.S. Pat. No. 4,591,443, for example, an aqueous solution containing hydrogen peroxide, together with a compound for controlling the mobility of the aqueous solution by modifying the viscosity or other flow properties, is introduced into a permeable subterranean formation. It is not contemplated that the groundwater can be treated directly in this disclosure.

Forte et al., U.S. Pat. No. 4,167,973, discloses the use of strong oxidizing agents, which can include hydrogen peroxide, for treating contaminated water and the like which has been withdrawn from an underground source and is thereupon treated in a mixing device. The methodology is therefore of the pump and treat system type, and the treatment of the groundwater is not in situ.

Other patents of interest include U.S. Pat. Nos. 4,927,293 to Campbell, and 4,978,508 to Hansen et al.

Among the other deficiencies of the prior art, is the failure to define a system wherein a strong oxidizing agent such as hydrogen peroxide may be directly injected into groundwater in a manner such that it can react in situ with the hydrocarbon contaminants present in same, while at the same time providing techniques to assure the efficacy of the said method.

Pursuant to the foregoing it may be regarded as an object of the present invention to provide a method and system which enable economical, effective and rapid treatment of groundwater contaminated with hydrocarbons, so as to destroy the said hydrocarbons or reduce same to a level below that which is considered detrimental to human use.

It is a further object of the present invention to provide a method and apparatus of the foregoing character, which utilizes safe and readily available treatment chemicals, and which moreover results in output products which are harmless and safe.

It is a still further object of the invention to provide a method and apparatus which can be practiced with use of relatively simple equipment, and by relatively unskilled personnel.

SUMMARY OF INVENTION

Now in accordance with the present invention, a method is provided for remediating a hydrocarbon contaminated region of a subterranean body of groundwater, which is effective to destroy or reduce the initial concentration level of hydrocarbon contaminants, beneath that level which is considered detrimental or dangerous to humans.

Pursuant to the invention, a plurality of mutually spaced wells are provided by sinking same into the groundwater region, with which the bottoms of the wells intersect so as to provide means for injection of the reactants used in the invention. In the course of practicing the invention, a treating flow of a hydrogen peroxide solution is provided from one or more of the wells. Periodically the treating flow is stopped and a determination made of the hydrocarbon contaminant levels at each said well, the process being continued until the initial contaminant concentration levels drop below predetermined acceptable values. The treating flow may additionally contain reaction surface enhancing reagents, i.e. reagents such as dispersions of lime or the like, which provide increase or provide surfaces at which the reaction between the hydrogen peroxide and the hydrocarbon contaminants may occur. Similarly, effective amounts of catalytic agents may be incorporated into the treating solution or preferably are provided as a preinjection into the groundwater region to be treated. Typical such catalysts are initiation catalysts of various types known in the art to promote the desired reaction between the hydrogen peroxide and hydrocarbons. These reagents are particularly appropriate, e.g. where saturated alkanes are involved, which do not efficiently and readily react without an initiation catalyst. Typical catalysts of this nature can include dispersions of iron filings and/or dispersions of elemental silver or other metals known to be useful for this purpose. Other additives can also be employed to modify the rheology of the treating flow; and stabilizers and the like may be present in the hydrogen peroxide solution to inhibit premature reaction or decomposition of the oxidizer.

The reaction products of the method constitute innocuous substances, principally water and carbon dioxide predominantly with some associated oxygen and trace element oxidations all of which are lower order of concentrations. Peroxide cleaves aromatic ring structures, and oxidizes the resulting straight-chain or branched-chain alkanes. The oxidation proceeds through progressively shorter hydrocarbon chains, eventually resulting in carbon dioxide and water. The peroxide reduction leaves no hazardous residue itself. The hydrogen peroxide may be used in concentrations of from about to 10 to 35% by weight solutions, which are available commercially from many sources.

Typical flow rates used in the foregoing process can be of the order of 1 to 6 gallons of hydrogen peroxide solution per minute per well, expressed on the basis of a 35% by weight solution of hydrogen peroxide.

In a preferred mode of practicing the present invention, the existence of acceptable continuity and well interflow paths for the groundwater region to be treated is established by initially generating a test flow of a solution of hydrogen peroxide from one of the wells and monitoring pH changes at each other of the wells as a function of time. A pH drop of at least 0.2 is considered to be indicative of satisfactory conditions. The pH changes are characteristic of the REDOX reactions involved in the invention and are believed to result from the formation of carboxylic acids during the reaction between the hydrogen peroxide and hydrocarbons. Typical such products are acetic acid and certain alkyls. None of these components are hazardous, but if desired, they can be neutralized as part of the overall treatment process. Subsequent to detecting the said pH drop, a treating flow of the hydrogen peroxide solution is then provided from one or more of the wells. The treating flow is again periodically stopped and the hydrocarbon contaminant levels measured at each well until the initial concentration levels drop below predetermined acceptable values.

Typical treating flows are at the rate of 1 to 6 gallons of hydrogen peroxide per minute per well, expressed on the basis of a 35 weight percent solution of hydrogen peroxide. The treating flow is provided under a pressure not more than the hydrostatic head relative to ground surface at the point of treating flow discharge from the well. If the pressure exceeds this, it is possible for some of the reactants to pass upwardly through the porous overburden and create undesirable conditions on the ground surface. Very typically in most installations the treating flow is under a pressure of about 6 to 40 psig, subject to the boundary condition indicated in the foregoing.

The total treating flow of hydrogen peroxide solution will generally be in the range of 1 to 5% by weight of the effective volume of contaminated water which is to be treated, expressed on the basis again of a 35% solution of hydrogen peroxide. The "effective volume" is considered for purposes of this specification includes not only the pooled or possibly slowly flowing groundwater region per se, but as well the overburden which defines the region between the top of the groundwater and the overlying surface accessible to atmosphere. This is considered appropriate in that the communication between overburden and groundwater is such that water can flow with relative ease between the surface overburden and groundwater, and hence in calculating quantities of treating reactants, account should desirably be taken of this factor. "Effective volume" also reflects the apparent interflow from adjacent regions into the region being treated. Boundary interflow can be evaluated by observing how rapidly the pH may change as a function of time at the various wells after a test flow is completed, i.e. a relatively rapid change will indicate that flow from adjacent regions is relatively high, leading to an adjustment in the initially calculated effective volume of the order of 10 to 20%.

The total volume utilized in the test flow is typically 0.5 to 1% by weight of the effective volume of the contaminated water, expressed on the basis of a 35% hydrogen peroxide solution.

In typical treatment arrangements pursuant to the invention at least three injection wells are utilized which are spaced about the periphery of the groundwater region to be treated. The test flow is injected at one said well and the pH changes are monitored at the other said wells.

In a further aspect of the invention, it has been found that in addition to the pH change serving as a sensitive indicator of interflow and continuity, temperature changes also resulting from the aforementioned REDOX reactions may serve as an additional monitoring parameter. Thus in this aspect of the invention the temperature changes are monitored at one or more other of the wells during the test flow process. A temperature rise of at least 2° F. at each well spaced from the injection well is considered a confirmatory indicator of the acceptable continuity and well interflow paths.

In the special case in which a static plume is found to exist, same being indicated by observing following moderate atmospheric precipitation that the water levels in the plurality of spaced wells show common changes in height, the treatment regime involves confirming the existence of the static plume by generating a test flow of a solution of hydrogen peroxide from one of the said wells and monitoring the absence of pH changes at each other of the said wells as a function of time. A treating flow of hydrogen peroxide solution from each of the wells is then provided at a representative rate of 1 to 6 gallons/minute to establish a radial sweep about each said well, the total volume of treating solution being again from 1 to 5% by weight of the effective volume of contaminated water expressed on the basis of a 35% hydrogen peroxide solution.

BRIEF DESCRIPTION OF DRAWINGS

The invention is diagrammatically illustrated, by way of example, in the drawings appended hereto in which.

DESCRIPTION OF PREFERRED EMBODIMENT

Figure 1:
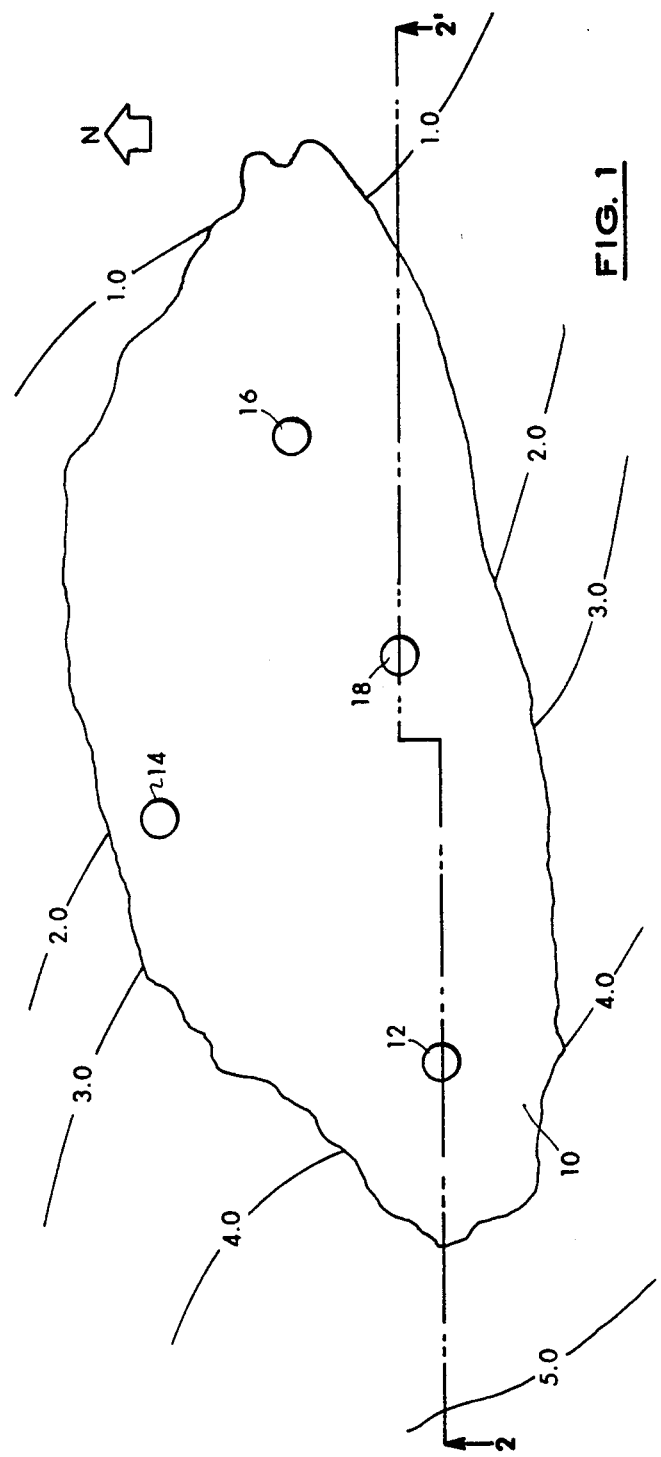
FIG. 1 is plan elevational view, diagrammatic in nature of the topography of a site at which groundwater is to be treated.
Figure 2:
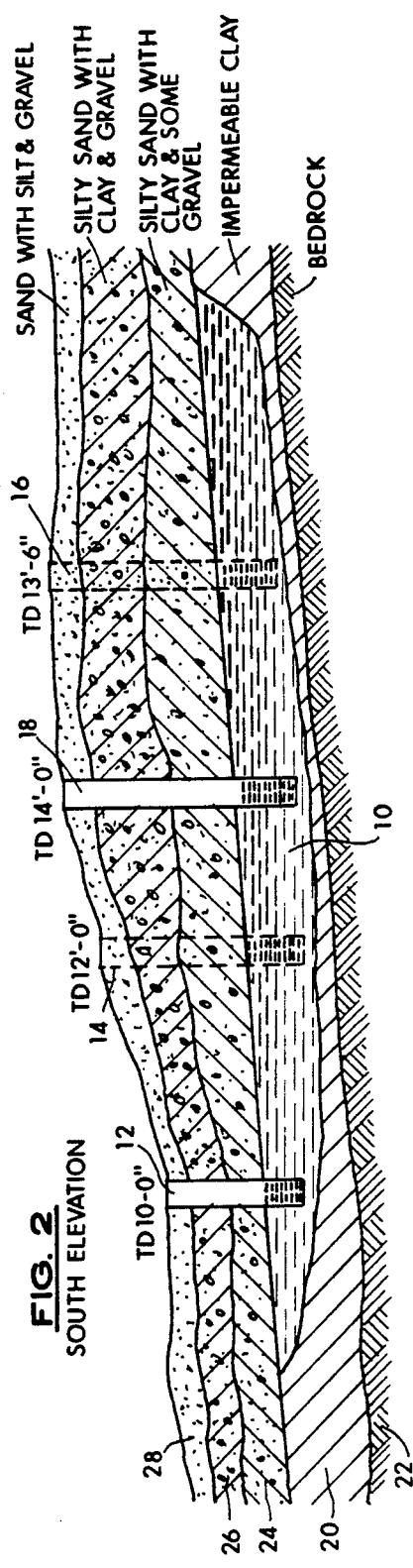
FIG. 2 is a cross-sectional view taken along the line 2—2 of FIG. 1, and illustrating in the subterranean characteristics of the mapped portion of FIG. 1.

Referring to FIGS. 1 and 2, plan and cross-sectional views are shown of a typical site in which the method of the invention may be utilized. Contours and topography are indicated by appropriate indicia in feet and inches. The groundwater reservoir to be treated is shown in outline at 10 in FIG. 1, at which it is seen that four monitoring and injecting wells 12, 14, 16 and 18 are provided, generally around the periphery of the groundwater reservoir 10 to be treated. As best seen in the cross-sectional view of FIG. 2, each of the wells extend to intersect groundwater reservoir 10. Reservoir 10 may be considered to be polluted with various organic contaminants of the type previously discussed. The groundwater reservoir 10 lies atop an impermeable clay layer 20 underneath which bedrock 22 is present. Atop the groundwater reservoir, in order is a silty sand with clay and some gravel layer 24; a silty sand with clay and gravel layer 26; and finally a sand with silt and gravel layer 28. The soil layers atop the reservoir are generally porous and permit with relative ease communication of atmospheric precipitation with the said reservoir. The present reservoir 10 may be considered as not being a static plume; i.e. flow to and from same is readily possible, although obviously is impeded by the surrounding surfaces and boundaries.

Figure 3:
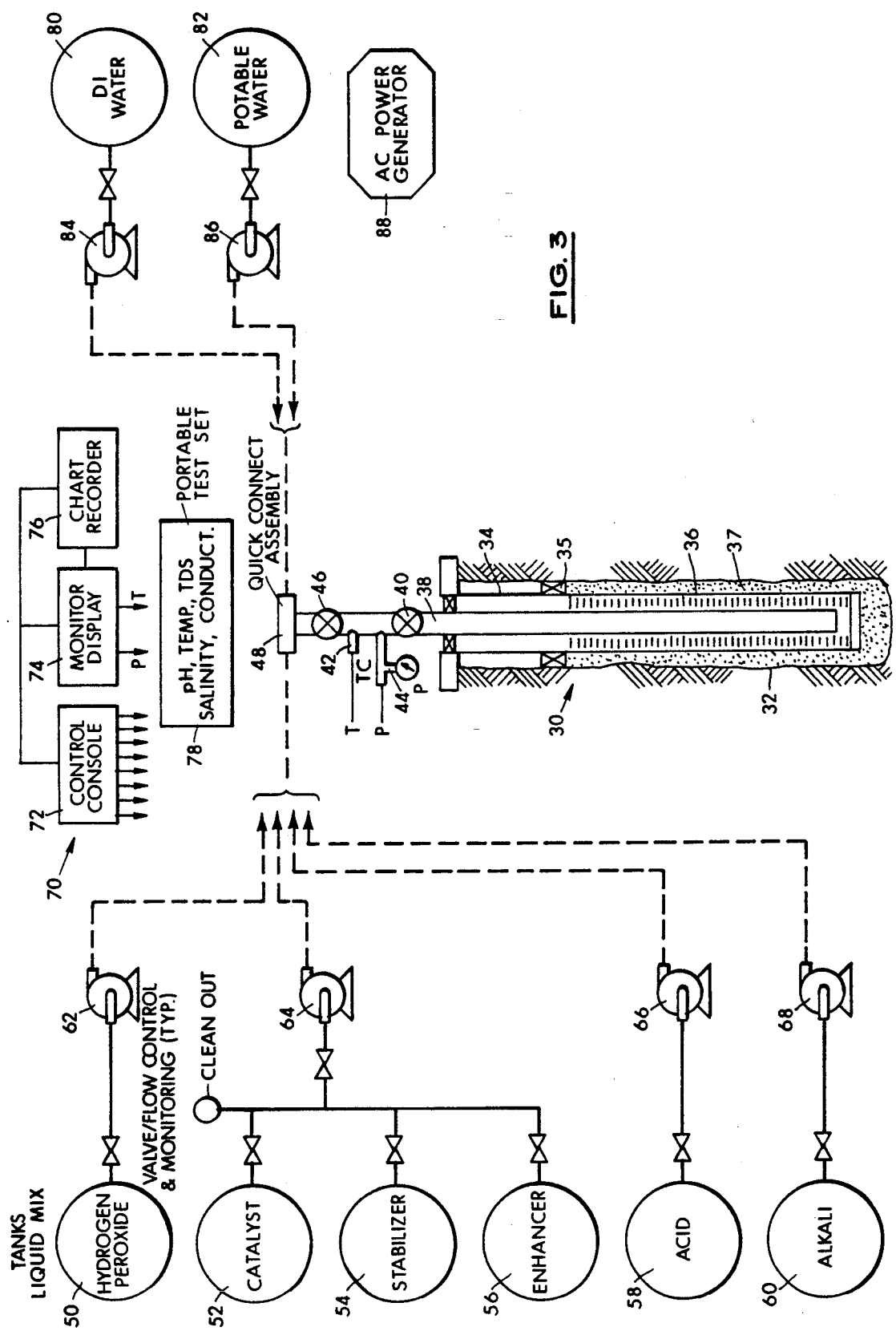
FIG. 3 is a schematic cross-sectional view through a representative monitoring end injection well of the type utilized in FIGS. 1 and 2. The control elements used in connection with the method and system are schematically illustrated in this Figure.

Details of a specific monitoring and injection well 30 are seen in FIG. 3. A borehole 32 is provided in which a well casing 34 typically of a PVC material, is inserted as a liner. This liner, as is well known in the art, is provided beneath seal 35 with a slotted well screen 36, i.e. the PVC is provided with multiple fine slots to create the screened effect. A sand/gravel pack 37 surrounds slotted screen 36. An injection string 38 extends to the interior of the well. A valve 40 is provided and a temperature transducer 42 and a pressure transducer 44 are connected to the upper, i.e. above-ground portion of injection string 38 between valve 40 and a valve 46. A quick connect assembly is provided at 48. Schematically shown in FIG. 2 are a series of supply tanks 50, 52, 54, 56, 58 and 60, respectively being used for the hydrogen peroxide treating solution, catalyst, stabilizer, enhancer, acids, and alkalies as required. Additional tanks may be provided e.g. when more than one catalyst is used. Pumps 62, 64, 66 and 68 may dispense these components to the quick connect assembly and thereby to the injection and monitoring well 30. Each of the pumps is under control of a control station 70 including a control console 72. Monitoring display 74 provides data and information to the operator, including pressures and temperatures from the transducers at 42 and 44. A chart recorder 76 is similarly provided at the control station 70. A portable test set 78 may be used to establish such parameters as pH, temperature, salinity, conductivity and the like. When needed, deionized water from tank 80 and potable water from tank 82 can also be provided via pumps 84 and 86 to the quick connect assembly 48. The entire system is highly portable; an A.C. power generator 88 is provided, and may be driven by a gasoline or other motor. This provides power for all control units including the central control station 70. It will be appreciated that a monitoring flow can be withdrawn from the well, as can a treating or test flow be injected via the well into the groundwater which the well intersects.

The volume of groundwater reservoir 10 is known in advance from the plurality of wells, which have served to establish the level of the reservoir and depth of the water in same, and the general contours of same. It will be clear that from these considerations the effective volume, i.e. including the reservoir and overburden is calculable—which effective volume may include a 10 to 20% additive factor for porous flow to adjacent zones which are lateral to the region of interest. In the course of operating the present system, and pursuant to the foregoing discussion, the existence of acceptable continuity and well interflow paths for the region to be treated is established by generating a test flow from one of the wells and monitoring pH changes at the other of the wells as a function of time. A pH drop of at least 0.2 is taken as indication of satisfactory well interflow paths and continuity. Thereafter the treating flow of hydrogen peroxide solution is initiated from the tank 62. As also mentioned, and in advance of this, an initiation catalyst can be injected from tank 52, as can the other additives if desired, such as stabilizers from tank 54, enhancers from tank 56, and acid and alkali adjustments from tanks 58 and 60.

Among the additives which may be utilized in the present process, are silicate-based inorganic polymers which can serve as finely divided high surface area powders used as adsorbent catalysts. As mentioned, finely divided iron filings and potable water can be used as an initiation catalyst by injection in advance of the treating solution. Other initiation catalyst water solutions include molybdenum, nickel, silver, platinum, and gold, all of which can be added in catalytically effective quantities. Powdered lime can be used as an enhancer with water to encourage saturated alkanes, i.e. unleaded gas and oil, to adsorb onto the lime surface along with hydrogen peroxide. Other additives such as hydralizable polymers can be used to increase viscosity and control diffusion through the groundwater. Various viscosity modifiers in a potable water mix can include ordinary compatible household laundry soaps, mixtures of sodium hydroxide and sodium lauryl sulfate, lime, magnesium oxide, diatamaceous earth anionic, cationic and nonionic polymers. Alkaline agent enhancers may be used to accelerate aromatic ring structures dehalogenation and decomposition. Also, as known in the art of conducting reactions with hydrogen peroxide, stabilizer solutions can be used, including amino trimethylene phosphonic acid; and other organophosphorus compounds. It should be appreciated that the reactions between hydrogen peroxide and hydrocarbons are not per se of the present invention, and the invention encompasses use of various catalysts and other additives which facilitate or accelerate these reactions as are known in the art.

The invention is further illustrated in the following example, which is illustrative of the efficacy of the present invention, without being, however, intended to be delimitative thereof.

EXAMPLE

In this Example the site remediated pursuant to the invention was an abandoned gasoline service station at which a subterranean groundwater reservoir similar to that in FIGS. 1 and 2 was present, which was heavily contaminated with hydrocarbons. Four wells were sunk into the reservoir, generally about the periphery of the reservoir. Depth characteristics for the reservoir and initial BTEX contamination was measured, and are shown in Table I.

In order to establish the acceptability of continuity and well interflow paths, a 35% $H_2O_2$ solution was injected into Well No. 1 (situated updip in the groundwater reservoir structure) at a rate of 1 gallon per minute for a period appropriate to provide 1% by weight of the effective volume of contaminated water in the reservoir. The effective volume included the relatively porous overburden and a 10% additive factor based on groundwater reservoir structure extending beyond the cleanup site boundaries. pH at Wells No. 2, 3 and 4 at the start of the test flow was 6.9 avg. After a period of 7 days, pH was found to have dropped to 5.5 at No. 2, to 6.1 at No. 3, and to 6.7 at No. 4, indicating acceptable continuity and well interflow paths.

In a first cycle of treatment 1.4% by weight of the effective contaminated water volume to be treated, of the 35% $H_2O_2$ solution was injected via Well No. 1 at a rate of 6.0 gallons per minute (no additives were used). After 5 days, measurements of the BTEX levels at the four wells was determined. One month later the same injection procedure was repeated for Wells No. 2 and 4 using the same 1.4% of treating solution (by weight of the effective volume of contaminated groundwater). BTEX measurements were repeated 10 days after the second injection. Data for the foregoing are tabulated in Table I below:

TABLE 1

|  | Well 1 | Well 2 | Well 3 | Well 4 |
| --- | --- | --- | --- | --- |
| Depth to Water (ft) | 3.7 | 3.1 | 2.9 | 3.4 |
| Depth to Bottom (ft) | 13.4 | 11.6 | 11.3 | 11.4 |
| Water Column (ft) | 9.7 | 8.5 | 8.4 | 8.0 |
| Initial Total BTEX (ppm) | 107 | 6310 | 2410 | 10820 |
| First Treatment (%) | 1.4 | 1.4 | 1.4 | 1.4 |
| Total BTEX (ppm) | 0.01 | 8.4 | 0.3 | 580 |
| Second Treatment (%) | 1.4 | 1.4 | 1.4 | 1.4 |
| Total BTEX (ppm) | 0.02 | 3.7 | 0.7 | 22.3 |

TABLE I-continued

The reduction in BTEX levels is seen to be remarkable. A further cycle in which 1.8% by weight of the 35% $H_2O_2$ solution was injected into Wells Nos. 2 and 4 dropped the total BTEX levels even further, respectively to 0.9 and 1.9 ppm.

While the present invention has been particularly set forth in terms of specific embodiments thereof, it will be understood in view of the instant disclosure that numerous variations on the invention are now enabled to those skilled in the art which variations yet reside within the present teachings. Accordingly the invention is to be broadly construed and limited only by the scope and spirit of the claims now appended hereto.

What is claimed is:

1. A method for remediating a hydrocarbon-contaminated region of a subterranean body of groundwater to destroy or reduce the initial concentration levels of hydrocarbon contaminants, comprising the steps of:
   (a) providing a plurality of mutually spaced wells intersecting said groundwater region;
   (b) determining the existence of acceptable continuity and well interflow paths for the said region by generating a test flow of a solution of hydrogen peroxide from one of said wells and monitoring pH changes at each other of said wells as a function of time to detect a pH drop of at least 0.2; and
   (c) subsequent to detecting said pH drop, providing a treating flow of said hydrogen peroxide solution from one or more of said wells.

2. A method in accordance with claim 1, wherein the treating flow is periodically stopped and the hydrocarbon contaminant levels measured at each said well, until the said initial contaminant concentration levels drop below predetermined acceptable values.

3. A method in accordance with claim 2, wherein said treating flow is at the rate of 1 to 6 gallons of hydrogen peroxide per minute per well, expressed on the basis of a 35% by weight solution of hydrogen peroxide.

4. A method is accordance with claim 3, wherein the treating flow is provided under a pressure not more than the hydrostatic head relative to surface at the point of treating flow discharge from said well.

5. A method in accordance with claim 4, wherein the treating flow is provided under a pressure of from 6 to 40 psig.

6. A method in accordance with claim 4, wherein the total said treating flow of hydrogen peroxide solution is 1 to 5% by weight of the effective volume of contaminated water which is treated, expressed on the basis of a 35% solution of hydrogen peroxide.

7. A method in accordance with claim 1, wherein the total volume in the test flow is 0.5 to 1.0% by weight of the effective volume of contaminated water, expressed on the basis of a 35% solution of hydrogen peroxide, and is injected at the rate of 0.3 to 1 gallon/minute and at a pressure which is not more than the hydrostatic head relative to surface at the point of treating flow discharge from said well.

8. A method in accordance with claim 1, including at least 3 said wells, which are spaced about the periphery of said groundwater region.

9. A method in accordance with claim 8, wherein said test flow is injected at one said well and the said pH change monitored at said other wells.

10. A method in accordance with claim 1, further including in step (b), monitoring temperature changes at one or more other of said wells to detect a temperature rise of at least 2° F. as a confirmatory indicator of said acceptable continuity and well interflow paths.

11. A method for remediating a hydrocarbon-contaminated region of a subterranean body of groundwater to destroy or reduce the initial concentration levels of hydrocarbon contaminants, comprising the steps of:
    (a) providing a plurality of mutually spaced wells intersecting said groundwater region;
    (b) providing a treating flow of a hydrogen peroxide solution from one or more of said wells; and
    (c) periodically stopping the treating flow and determining the hydrocarbon contaminant levels measured at each said well, until the said initial contaminant concentration levels drop below predetermined acceptable values.

12. A method in accordance with claim 11, wherein said treating flow is at the rate of 1 to 6 gallons of hydrogen peroxide per minute per well, expressed on the basis of a 35% by weight solution of hydrogen peroxide.

13. A method in accordance with claim 12, wherein the treating flow is provided under a pressure of from 6 to 40 psig, but not more than the hydrostatic head relative to surface at the point of treating flow discharge from said well.

14. A method in accordance with claim 13, wherein the total said treating flow of hydrogen peroxide solution is 1 to 5% by weight of the effective volume of contaminated water which is treated, expressed on the basis of a 35% solution of hydrogen peroxide.

15. A method in accordance with claim 11, wherein said treating solution includes from about 10 to 35% by weight hydrogen peroxide.

16. A method in accordance with claim 15, wherein prior to step (b) a treating flow is injected from said one or more wells into said region of groundwater, which includes at least one catalytically effective amount of an initiation catalyst for the redox reaction between said hydrogen peroxide and the hydrocarbon contaminant sought to be reacted.

17. A method in accordance with claim 15, wherein said treating solution further includes a reaction surface enhancing reagent.

18. A method for remediating a hydrocarbon-contaminated subterranean static plume of groundwater to destroy or reduce the initial concentration levels of hydrocarbon contaminants, comprising the steps of:
    (a) providing a plurality of mutually spaced wells intersecting said static plume groundwater;
    (b) measuring the change in water depth at each of said wells following atmospheric precipitation, to determine by common depth changes the likelihood of said plume;
    (c) confirming the existence of the static plume by generating a test flow of a solution of hydrogen peroxide from one of said wells and monitoring the absence of pH changes at each other of said wells as a function of time; and
    (d) providing a treating flow of said hydrogen peroxide solution from each of said wells at a rate of from 1 to 6 gallons per minute to establish a radial sweep about each said well, the total volume of treating solution being from 1 to 5% by weight of the effective volume of contaminated water, expressed on the basis of a 35% solution of hydrogen peroxide.

19. A method in accordance with claim 18, wherein the treating flow is periodically stopped and the hydrocarbon contaminant levels measured at each said well, until the said initial contaminant concentration levels drop below predetermined acceptable values.

20. A method in accordance with claim 18, wherein the treating flow is provided under a pressure not more than the hydrostatic head relative to surface at the point of treating flow discharge from said well.

21. A method in accordance with claim 20, wherein the treating flow is provided under a pressure of from 6 to 40 psig.

22. A system for remediating a hydrocarbon-contaminated region of a subterranean body of groundwater to destroy or reduce the initial concentration levels of hydrocarbon contaminants, comprising:
    (a) a plurality of mutually spaced wells disposed to intersect said groundwater region;
    (b) means for generating a test flow of a solution of hydrogen peroxide from one of said wells;
    (c) means for monitoring pH changes at each other of said wells as a function of time to detect a pH drop of at least 0.2, whereby to establish the existence of acceptable continuity and well interflow paths for the said region; and
    (d) means for providing, subsequent to detecting said pH drop, a treating flow of said hydrogen peroxide solution from one or more of said wells.

* * * * *